United States Patent
Nicholls et al.

(10) Patent No.: US 9,099,147 B1
(45) Date of Patent: Aug. 4, 2015

(54) DATA STORAGE DEVICE COMMUTATING A SPINDLE MOTOR USING CLOSED-LOOP ROTATION PHASE ALIGNMENT

(71) Applicant: Western Digital Technologies, Inc., Irvine, CA (US)

(72) Inventors: Michael T. Nicholls, Laguna Hills, CA (US); Steven Nemshick, Santa Ana, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/492,357

(22) Filed: Sep. 22, 2014

(51) Int. Cl.
| | | |
|---|---|---|
| G11B 19/28 | (2006.01) | |
| G11B 19/06 | (2006.01) | |
| G11B 19/20 | (2006.01) | |
| G11B 15/02 | (2006.01) | |
| G11B 15/48 | (2006.01) | |

(52) U.S. Cl.
CPC .............. *G11B 19/28* (2013.01); *G11B 19/06* (2013.01); *G11B 19/20* (2013.01); *G11B 15/026* (2013.01); *G11B 15/48* (2013.01); *G11B 19/2054* (2013.01); *G11B 19/2063* (2013.01)

(58) Field of Classification Search
CPC ...... G11B 15/43; G11B 15/48; G11B 15/026; G11B 19/14; G11B 19/04; G11B 19/06; G11B 19/20; G11B 19/28; G11B 19/2054; G11B 19/2063
USPC ............ 360/70, 73.03, 75, 55, 69, 71, 73.01, 360/48, 51; 318/400.34, 254.1, 400.1
See application file for complete search history.

(56) References Cited

U.S. PATENT DOCUMENTS

| | | | |
|---|---|---|---|
| 5,260,631 A | 11/1993 | Hayashida et al. | |
| 5,471,353 A | 11/1995 | Codilian et al. | |
| 5,898,283 A | 4/1999 | Bennett | |
| 5,982,571 A * | 11/1999 | Calfee et al. | 360/70 |
| 6,014,283 A | 1/2000 | Codilian et al. | |
| 6,028,411 A | 2/2000 | Motzko et al. | |
| 6,052,076 A | 4/2000 | Patton, III et al. | |
| 6,052,250 A | 4/2000 | Golowka et al. | |
| 6,067,202 A * | 5/2000 | Rowan et al. | 360/73.03 |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |

(Continued)

*Primary Examiner* — Ali Neyzari (57) ABSTRACT

A data storage device is disclosed comprising a head actuated over a disk, and a spindle motor configured to rotate the disk, wherein the spindle motor comprises a plurality of windings. A commutation controller is configured to commutate the windings based on a commutation sequence driven by an oscillator. A rotation phase of the spindle motor is measured, and a phase error is generated based on the measured rotation phase of the spindle motor and a phase of the commutation sequence, wherein a frequency of the oscillator is adjusted based on the phase error.

18 Claims, 6 Drawing Sheets

(56) References Cited

U.S. PATENT DOCUMENTS

| | | |
|---|---|---|
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,380,703 B1 | 4/2002 | White |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,753,667 B2 | 6/2004 | Sakamoto |
| 6,754,025 B1 | 6/2004 | Shepherd et al. |
| 6,760,186 B1 | 7/2004 | Codilian et al. |
| 6,788,483 B1 | 9/2004 | Ferris et al. |
| 6,791,782 B1 | 9/2004 | Codilian et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,075,746 B1 | 7/2006 | Kupferman |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,776 B1 | 10/2006 | Warren, Jr. et al. |
| 7,126,781 B1 | 10/2006 | Bennett |
| 7,158,329 B1 | 1/2007 | Ryan |
| 7,170,249 B2 | 1/2007 | Ang et al. |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,433,148 B2 | 10/2008 | Wong |

(56) References Cited

U.S. PATENT DOCUMENTS

| | | |
|---|---|---|
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,561,364 B2 | 7/2009 | Shin |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,207,696 B1 | 6/2012 | Ito |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,395,341 B1 | 3/2013 | Ying et al. |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,618,764 B1 | 12/2013 | Ying et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 * | 5/2014 | Zhou et al. ............ 360/78.09 |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |

(56) References Cited

U.S. PATENT DOCUMENTS

| | | |
|---|---|---|
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2006/0055353 A1 | 3/2006 | Van As et al. |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

DATA STORAGE DEVICE COMMUTATING A SPINDLE MOTOR USING CLOSED-LOOP ROTATION PHASE ALIGNMENT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
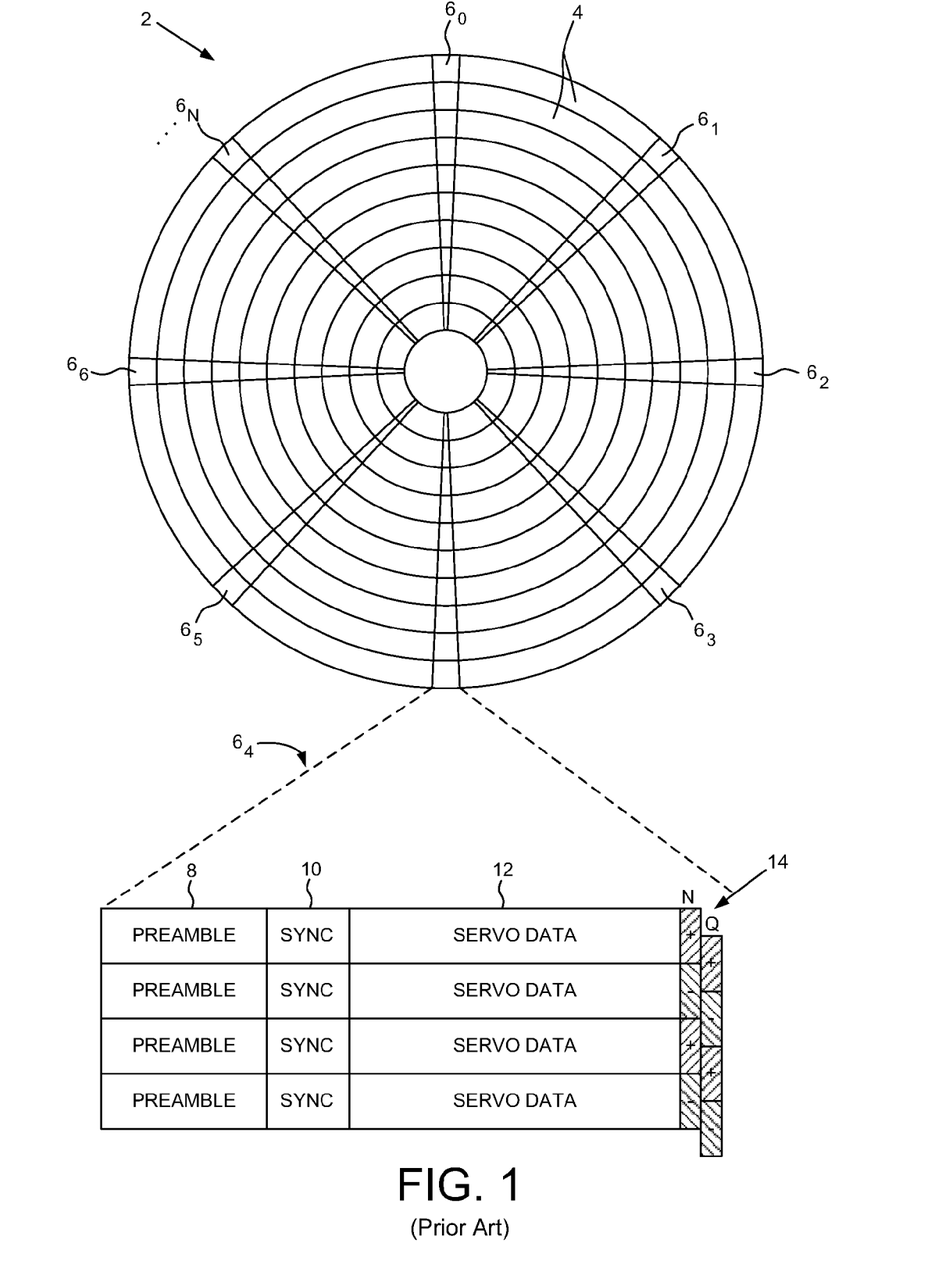
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The disk 2 is typically rotated by a spindle motor at a high speed so that an air bearing forms between the head and the disk surface. A commutation controller applies a driving signal to the windings of the spindle motor using a particular commutation sequence in order to generate a rotating magnetic field that causes the spindle motor to rotate. Prior art disk drives have typically controlled the commutation of the windings by measuring a zero-crossing frequency of a back electromotive force (BEMF) voltage generated by the windings of the spindle motor.

DETAILED DESCRIPTION

Figure 2A:
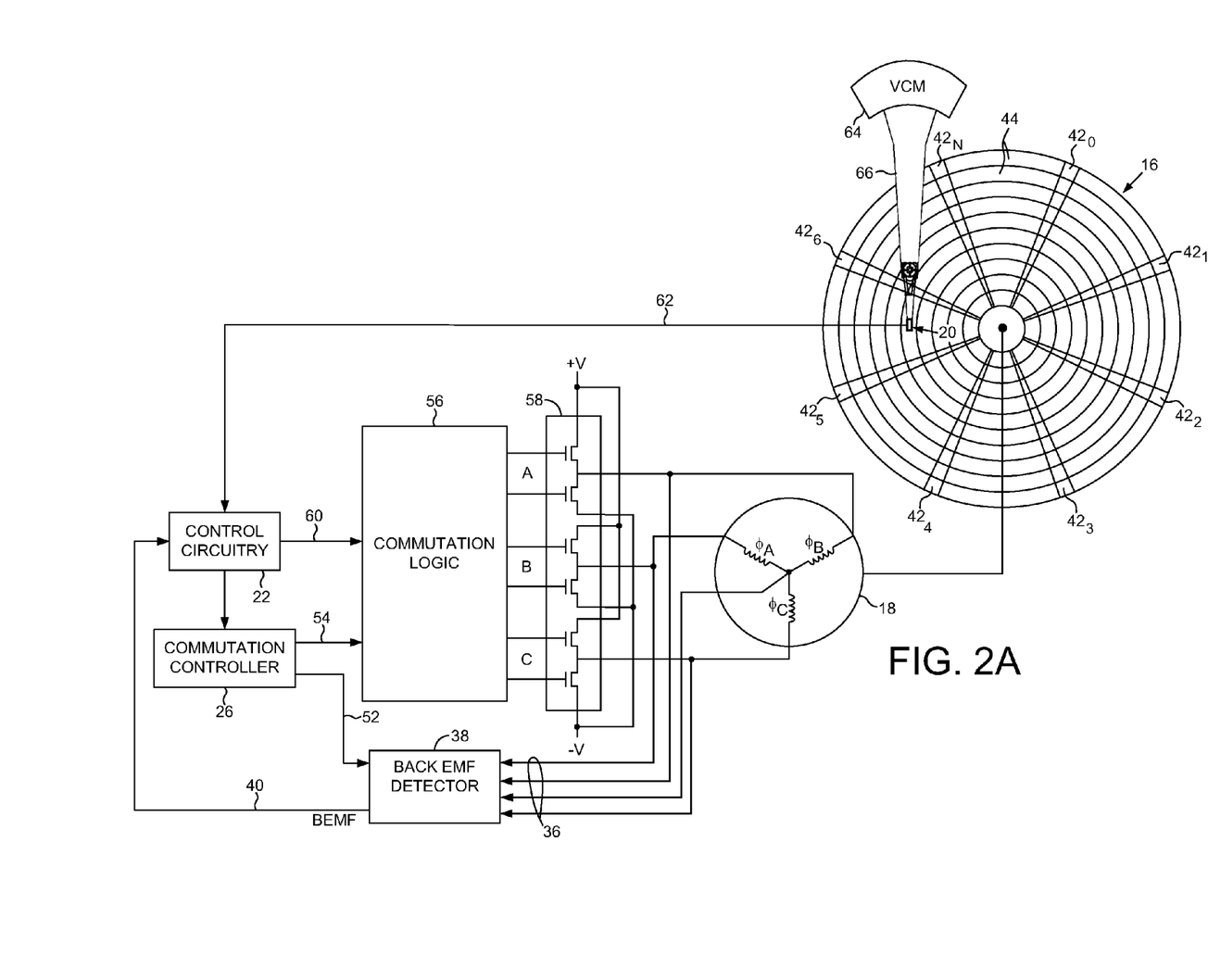
FIG. 2A shows a data storage device in the form of a disk drive according to an embodiment comprising a head actuated over a disk, and a commutation controller configured to commutate the windings of a spindle motor based on a commutation sequence.
Figure 2B:
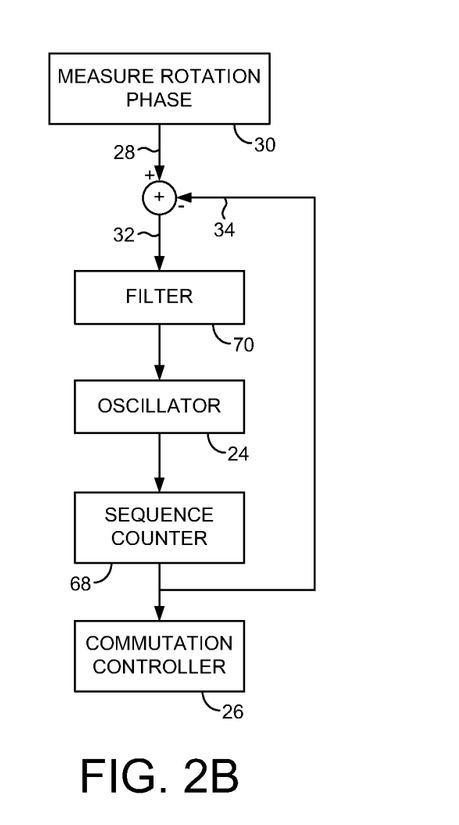
FIG. 2B shows control circuitry according to an embodiment wherein a measured rotation phase of the spindle motor is compared to a phase of the commutation sequence to generate a phase error used to adjust the frequency of an oscillator.

FIG. 2A shows a data storage device according to an embodiment comprising a disk 16, and a spindle motor 18 configured to rotate the disk 16, wherein the spindle motor 18 comprises a plurality of windings. The disk drive further comprises a head 20 actuated over the disk 16, and control circuitry 22 comprising an oscillator 24 (FIG. 2B) configured to drive a commutation controller 26 configured to commutate the windings based on a commutation sequence. FIG. 2B shows an embodiment wherein a rotation 28 phase of the spindle motor 18 is measured at block 30. A phase error 32 is generated based on the measured rotation phase 28 of the spindle motor and a phase 34 of the commutation sequence, wherein a frequency of the oscillator 24 is adjusted based on the phase error 32.

Figure 3:
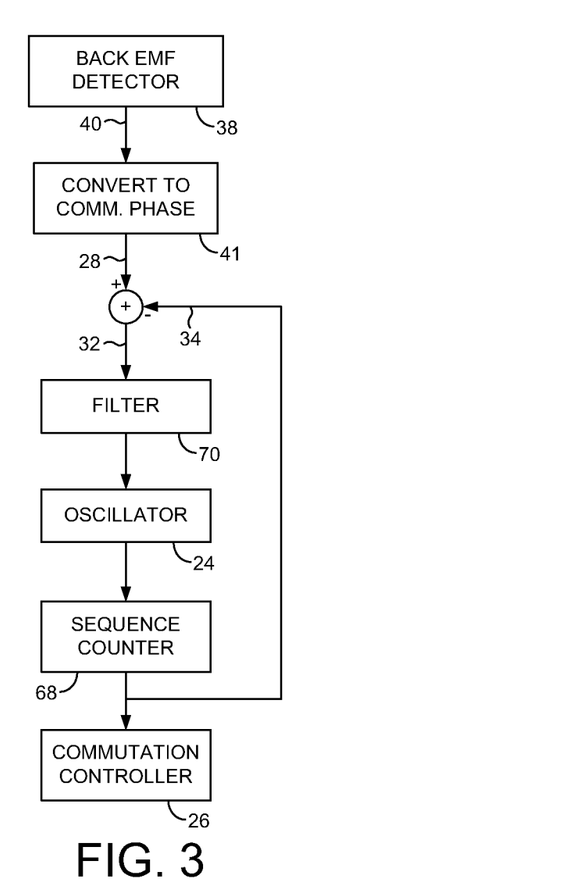
FIG. 3 shows an embodiment wherein the rotation phase of the spindle motor is measured based on zero crossings of a BEMF voltage generated by the windings of the spindle motor.
Figure 4:
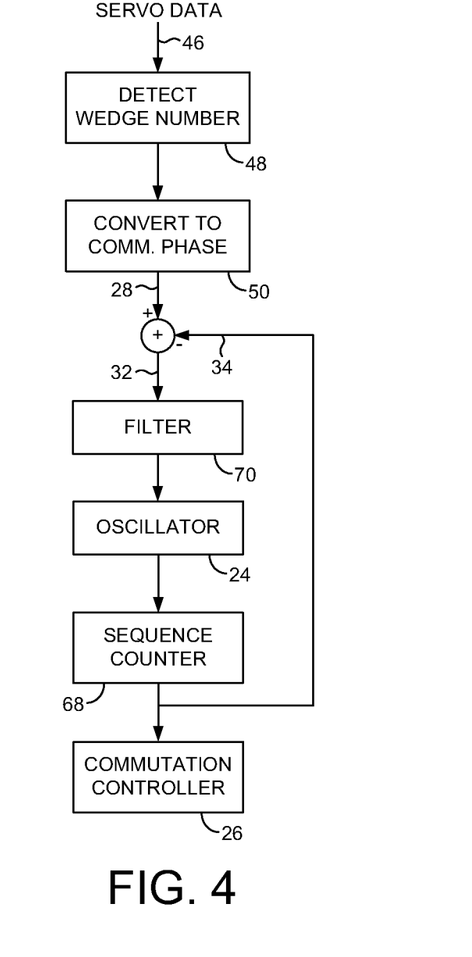
FIG. 4 shows an embodiment wherein the rotation phase of the spindle motor is measured based on servo sectors read from the disk.

The rotation phase 28 of the spindle motor 18 may be generated in any suitable manner. In one embodiment shown in FIG. 2A, a back electromotive force (BEMF) voltage 36 generated by the windings of the spindle motor 18 may be processed in order to measure the rotation phase 28. For example, in an embodiment shown in FIG. 3, a BEMF detector 38 may generate a BEMF signal 40 representing zero crossings in the BEMF voltage 36 generated by the windings of the spindle motor 18. The BEMF signal 40 may be processed at block 41 to convert the BEMF zero crossings into a corresponding rotation phase 28 of the spindle motor 18. In another embodiment shown in FIG. 4, the rotation phase 28 of the spindle motor 18 may be measured based on timing data recorded on the disk 16, such as servo sectors $42_0$-$42_N$ that define servo tracks 44 (FIG. 2A). The servo data 46 read from the servo sectors may be processed at block 48 to detect a corresponding wedge number representing the sequence number of the servo sectors. The detected wedge number is converted at block 50 into a corresponding rotation phase 28 of the spindle motor 18.

In one embodiment, while the disk is being spun up and/or when synchronizing to the timing data on the disk 16 is lost, the control circuitry 22 shown in FIG. 2A may process the BEMF signal 40 representing the BEMF zero-crossings. The commutation controller 26 may generate a control signal 52 which configures the BEMF detector 38 to detect the zero-crossing of the BEMF voltage generated by each winding as the disk rotates. The commutation controller 26 also generates a control signal 54 applied to commutation logic 56. In the embodiment of FIG. 2A, the commutation logic 56 is configured by the control signal 54 to control the state of switches 58 in order to drive the windings with driving voltages +V and −V. The commutation logic 56 may operate in any suitable manner, such as by driving the switches 58 as linear amplifiers that apply continuous-time sinusoidal voltages to the windings. In another embodiment, the commutation logic 56 may drive the switches 58 using pulse wide modulation (PWM), such as using square wave PWM, trapezoidal PWM, or sinusoidal PWM. Regardless as to how the windings are driven, the commutation controller 26 generates the control signal 54 so that the windings are commutated at the correct periods, thereby generating the desired rotating magnetic field that causes the spindle motor to rotate. In one embodiment, the control circuitry 22 may generate a control signal 60 that controls the effective amplitude of the driving voltages (continuous or PWM), thereby controlling the speed of the spindle motor.

In one embodiment, the commutation controller 26 may disable the driving voltage applied to the winding that the BEMF detector 38 is evaluating for a zero-crossing during a zero-crossing window. However, disabling the driving voltage typically induces current transients in the windings of the spindle motor, which can result in acoustic noise, torque/speed jitter, and disk vibration. Accordingly, in one embodiment after the disk 16 has spun up to a target operating speed and the control circuitry 22 has synchronized to the timing data on the disk 16, the control circuitry 22 may switch from using the BEMF signal 40 to using the timing data on the disk 16 to drive the commutation sequence. If synchronization to the timing data is lost for any reason, the control circuitry 22 may switch back to using the BEMF signal 40 to drive the commutation sequence.

In one embodiment, the control circuitry 22 processes a read signal 62 emanating from the head 20 to demodulate the servo sectors $42_0$-$42_N$ and generate a position error signal (PES) representing an error between the actual position of the head and a target position relative to a target track. The control circuitry 22 filters the PES using a suitable compensation filter to generate a control signal applied to a voice coil motor (VCM) 64 which rotates an actuator arm 66 about a pivot in order to actuate the head 20 radially over the disk 16 in a direction that reduces the PES. The servo sectors $42_0$-$42_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment shown in FIG. 2B, the frequency of the oscillator 24 drives a counter 68 the output of which drives the commutation sequence of the commutation controller 26. For example, in one embodiment the counter 68 is a modulo-N counter (where N+1 represents the number of states of the commutation sequence) so that the counter 68 continuously cycles from 0 to N as the commutation sequence is repeated. In one embodiment, the frequency of the oscillator 24 is adjusted so as to drive the phase error 32 toward zero, thereby commutating the windings at the desired frequency.

In one embodiment shown in FIG. 2B, the phase error 32 is filtered using a suitable filter 70 to generate a filtered phase error, and the frequency of the oscillator 24 is adjusted based on the filtered phase error. Any suitable filter 70 may be employed, wherein in FIG. 5 the filter 70 comprises a proportional-integral-derivative (PID) filter. In one embodiment, the control circuitry may adapt the filter 70 to reduce the average phase error 32. In another embodiment, the control circuitry may adapt the filter 70 to attenuate acoustic noise, and in one embodiment the control circuitry may adapt the filter 70 in response to an acoustic sensor integrated with the disk drive.

Figure 5:
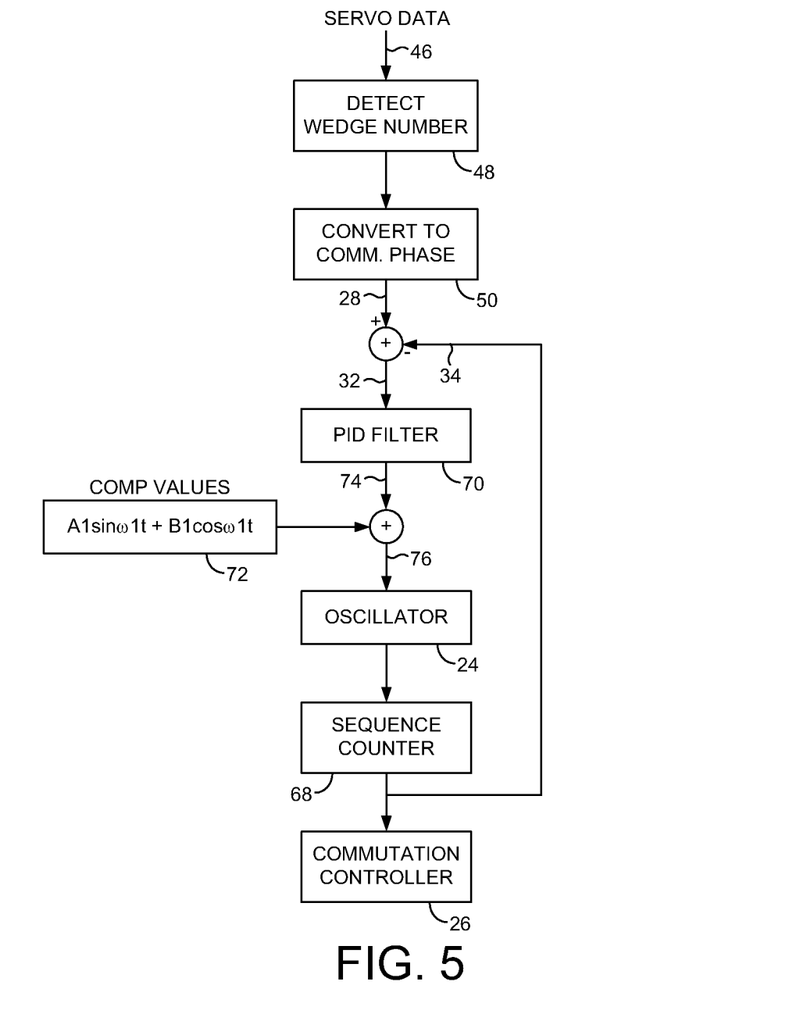
FIG. 5 shows an embodiment wherein the commutation sequence is driven based on compensation values that compensate for a mechanical parameter of the spindle motor.

FIG. 5 shows an embodiment wherein the control circuitry may generate compensation values 72 based on:

$$A1 \sin \omega 1 t + B1 \cos \omega 1 t$$

where A1 and B1 are adaptable coefficients and $\omega 1$ represents a frequency based on a mechanical parameter of the spindle motor 18. For example, in one embodiment the pole pairs of the spindle motor may exhibit an asymmetrical alignment due to manufacturing tolerances such that the optimal time to commutate the windings may be based on a fundamental frequency (the rotation frequency of the spindle motor) plus an additional frequency that accounts for the asymmetrical alignment of the pole pairs. Accordingly, in one embodiment the compensation values 72 generated based on the above sinusoid are added to the filtered phase error 74 to generate the control signal applied to the oscillator 24. In one embodiment, the control circuitry 22 may adapt the above coefficients A1 and B1 based on:

$$A1_{k+1} = A1_k - \gamma \cdot tErr_k \cdot \sin(\omega 1 t_k - \phi 1)$$

$$B1_{k+1} = B1_k - \gamma \cdot tErr_k \cdot \sin(\omega 1 t_k - \phi 1)$$

where $\gamma$ is a learning coefficient, and $tErr_k$ is a timing error based on a measured rotation period of the spindle motor (e.g., the timing error $tErr_k$ may be generated based on the phase error 32 or the filtered phase error 74). That is, the timing error $tErr_k$ will decrease toward zero as the coefficients A1 and B1 converge toward the correct values that compensate for the mechanical parameter of the spindle motor.

In one embodiment, the control circuitry 22 may generate the phase error 32 N times over a single revolution of the disk, where N is an integer greater than zero. For example, in the embodiment shown in FIG. 3, the control circuitry 22 may generate the phase error 32 at every BEMF zero crossing, or at every other BEMF zero crossing, or any other suitable frequency of BEMF zero crossings. In the embodiment shown in FIG. 4, the control circuitry 22 may generate the phase error 32 at every servo sector, or at every servo sector that corresponds to a BEMF zero crossing, or at any other suitable frequency of servo sectors.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a spindle motor configured to rotate the disk, wherein the spindle motor comprises a plurality of windings;
   a head actuated over the disk; and
   control circuitry comprising an oscillator configured to drive a commutation controller configured to commutate the windings based on a commutation sequence, the control circuitry configured to:
   measure a rotation phase of the spindle motor;
   generate a phase error based on the measured rotation phase of the spindle motor and a phase of the commutation sequence; and
   adjust a frequency of the oscillator based on the phase error.

2. The data storage device as recited in claim 1, wherein the control circuitry is further configured to measure the rotation phase of the spindle motor based on a back electromotive force (BEMF) voltage zero crossing of the spindle motor.

3. The data storage device as recited in claim 1, wherein:
   the disk comprises timing data; and
   the control circuitry is further configured to measure the rotation phase of the spindle motor based on the timing data.

4. The data storage device as recited in claim 3, wherein the timing data comprises servo sectors on the disk.

5. The data storage device as recited in claim 3, wherein control circuitry is further configured to generate the phase error N times over a single revolution of the disk, where N is an integer greater than zero.

6. The data storage device as recited in claim 1, wherein control circuitry is further configured to:
   filter the phase error to generate a filtered phase error; and
   adjust a frequency of the oscillator based on the filtered phase error.

7. The data storage device as recited in claim 6, wherein control circuitry is further configured to adapt the filtering to reduce the average phase error.

8. The data storage device as recited in claim 6, wherein control circuitry is further configured to adapt the filtering to attenuate acoustic noise.

9. The data storage device as recited in claim 6, wherein control circuitry further comprises an acoustic sensor, and the control circuitry is further configured to adapt the filtering based on the acoustic sensor.

10. A method of operating a data storage device, the method comprising:
    actuating a head over a disk;
    driving a commutation sequence based on an oscillator;
    measuring a rotation phase of a spindle motor configured to rotate the disk based on the commutation sequence;
    generating a phase error based on the measured rotation phase of the spindle motor and a phase of the commutation sequence; and
    adjusting a frequency of the oscillator based on the phase error.

11. The method as recited in claim 10, further comprising measuring the rotation phase of the spindle motor based on a back electromotive force (BEMF) voltage zero crossing of the spindle motor.

12. The method as recited in claim 10, wherein:
    the disk comprises timing data; and
    the method further comprises measuring the rotation phase of the spindle motor based on the timing data.

13. The method as recited in claim 12, wherein the timing data comprises servo sectors on the disk.

14. The method as recited in claim 12, further comprising generating the phase error N times over a single revolution of the disk, where N is an integer greater than zero.

15. The method as recited in claim 10, further comprising:
    filtering the phase error to generate a filtered phase error; and
    adjusting a frequency of the oscillator based on the filtered phase error.

16. The method as recited in claim 15, further comprising adapting the filtering to reduce the average phase error.

17. The method as recited in claim 15, further comprising adapting the filtering to attenuate acoustic noise.

18. The data storage device as recited in claim 15, further comprising adapting the filtering based on an acoustic sensor.

* * * * *